Sept. 27, 1966 R. L. LILLESTRAND ET AL 3,274,880
METHOD AND APPARATUS FOR OCCULTATION
DETECTION FOR SPACE NAVIGATION
Filed Jan. 31, 1963 2 Sheets-Sheet 1

INVENTORS
ROBERT L. LILLESTRAND
WILLIAM M. HILT
DANIEL C. HARRINGTON
BY Cushman, Darby & Cushman
ATTORNEYS INVENTORS
ROBERT L. LILLESTRAND
WILLIAM M. HILT
DANIEL C. HARRINGTON
BY
Cushman, Darby & Cushman
ATTORNEYS United States Patent Office 3,274,880
Patented Sept. 27, 1966

3,274,880
METHOD AND APPARATUS FOR OCCULTATION DETECTION FOR SPACE NAVIGATION
Robert L. Lillestrand, Minneapolis, Minn., William M. Hilt, Dayton, Ohio, and Daniel C. Harrington, Minneapolis, Minn., assignors to Control Data Corporation, Minneapolis, Minn., a corporation of Minnesota
Filed Jan. 31, 1963, Ser. No. 255,295
5 Claims. (Cl. 88—1)

This invention pertains to navigation and particularly to navigation of a vehicle in space.

It can be shown that if the actual times of ingress or disappearance of a plurality of stars behind a planet are recorded, where the stars are being observed from a vehicle in space, then a plurality of equations may be solved to give the space position of the vehicle. Moreover, the future track of the vehicle may be predicted.

Of immediate concern is the determination of star ingress behind our earth as observed from a vehicle in space. The notation of the instant of ingress behind the earth is complicated by the fact that an atmosphere surrounds the earth, and this is not uniform due to prevalence of cloud formations below certain altitudes. Also, the terrain of the earth is not regular, but is characterized by mountainous regions of considerable heighth.

In accordance with the present invention, it has been discovered that time of star ingress is best determined by noting the instant of time when the star's radiation, as received at the space vehicle, has been attenuated by the atmosphere to a certain fraction of its original intensity before the line-of-sight path from star to vehicle intercept the atmosphere. It has been discovered that an attenuation of fifty percent (merely as an example) provides an excellent ingress reference which is extremely reliable in the sense that local variations caused by mountains and clouds do not introduce error.

Therefore, it is a principal object of this invention to provide methods and apparatus for noting the time of star ingress by determining when the star's radiation has been atmosphere-attenuated by a predetermined amount, greater than zero, of its original intensity.

Figure 1:
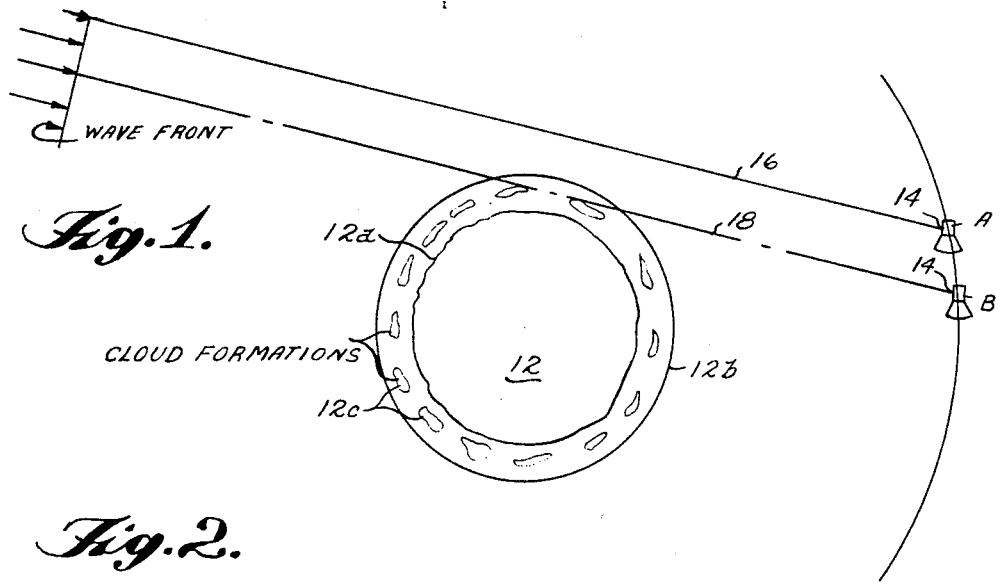
Figure 2:
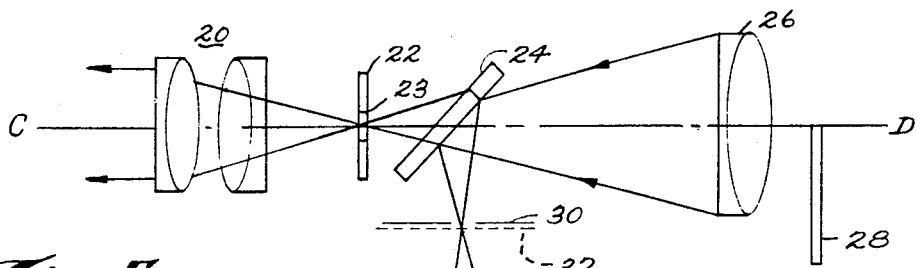
Figure 3:
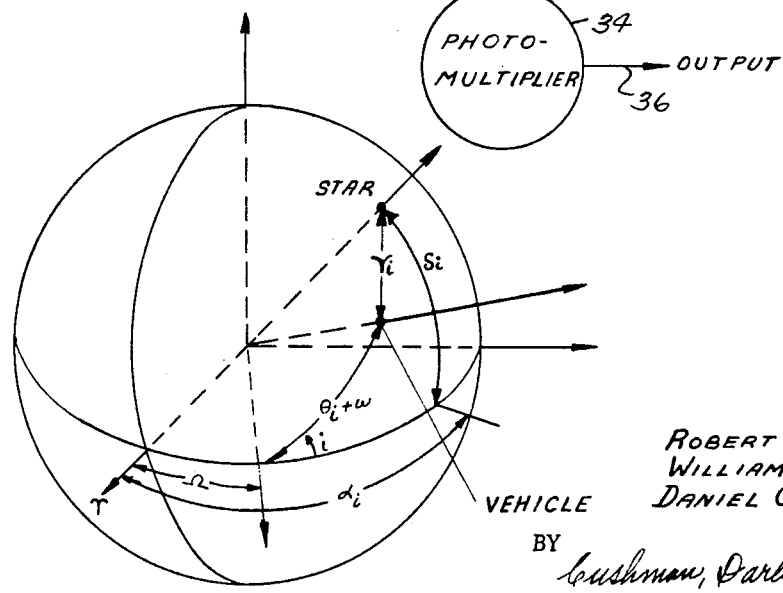
Figure 3:
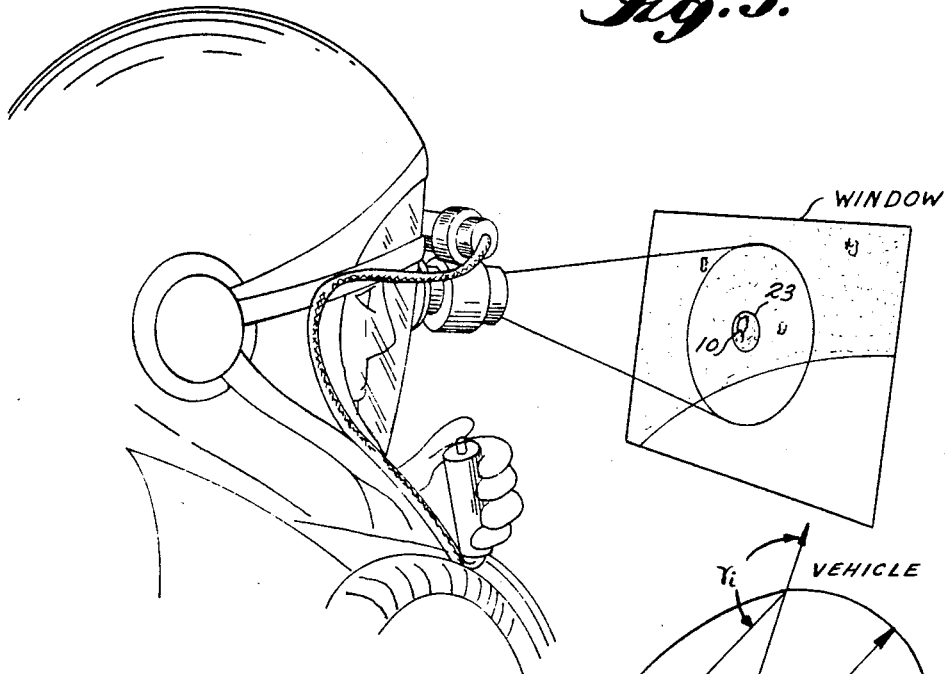
Figure 6:
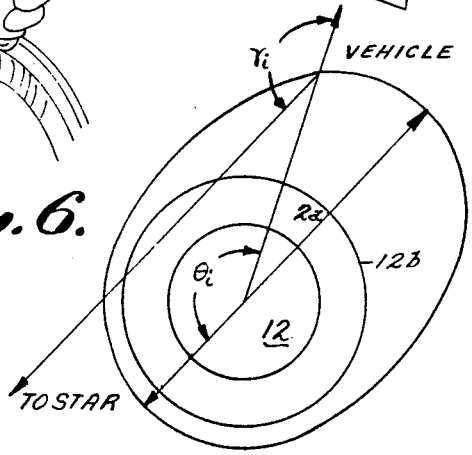
Figure 4:
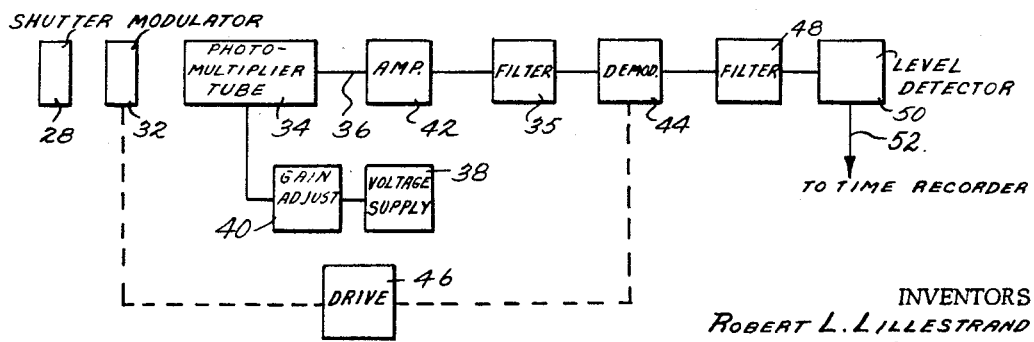

Further objects and the entire scope of the invention will become more fully apparent from the following detailed explanation of illustrative embodiments and from the appended claims. The illustrative embodiments may be best understood by reference to the accompanying drawings, wherein:

FIGURE 1 is a schematic diagram illustrating relative positions of a space vehicle, a planet and its atmosphere, and a start being sighted, FIGURE 2 is a schematic diagram of one embodiment of an optical system for use in sighting an ingress star, FIGURE 3 is a perspective view illustrating the use of the apparatus of FIGURE 2 in a space vehicle to track a star, FIGURE 4 is a schematic diagram in block form illustrating the attenuation detection system, FIGURE 5 is a schematic diagram illustrating the parameters of spherical trigonometry utilized in the dynamic formula of space vehicle movement, and FIGURE 6 is a schematic diagram illustrating additional parameters utilized in the dynamic formula of the space vehicle movement.

FIGURE 1 is intended to illustrate a wavefront from a distant star, an atmosphere-blanketed planet 12, e.g., the earth, and a space vehicle 14. The planet 12 is shown to have a mountainous surface, illustrated by surface irregularities such as 12a. An atmosphere is also suggested by line 12b, intended to depict the outer extent thereof, with cloud formation 12c.

Solid line 16 depicts a straight line-of-sight path of the star's radiation to the vehicle 14 in a first position thereof marked as A. Chain line 18 shows the radiation path when the vehicle has advanced to a position B. It is to be noted that radiation path 18 intercepts the atmosphere.

Next, referring to FIGURE 2, the craft 14 is to be fitted with an optical device including an eyepiece 20, an illuminated reticle 22, a partially silvered mirror 24, an objective lens 26, and a shutter device 28. An iris 30 and a light modulator device 32 are also provided in alignment between mirror 24 and a photo-sensitive electronic tube 34 having an electrical output line 36. Iris 30 is positioned immediately adjacent the light modulator 32 between the modulator and mirror 24. Components 20, 22, 24, 26 and 28 are arranged on an optical axis CD which in use is to be centered from C looking toward D on the apparent line-of-sight to a selected star.

This optical arrangement functions to pass a portion of the radiation through mirror 24 to the eyepiece 20 while reflecting radiation past iris 30 and modulator 32 to the photo-sensitive device 34.

As suggested in FIGURE 3, the structure of FIGURE 2 may be worn upon the head of the person in the vehicle, so that the image on reticle 22 may be readily moved to keep the image of the star centered therein, the star being observed through a window in the wall of the vehicle. The illuminated reticle circle 23 corresponds in diameter to the iris 30. Thus, when the astronaut centers the start within circle 23, he knows that the star's radiation is passing through the iris 30 and impinging on the photo-sensitive device 34.

The amount of light reaching the eyepiece and the photo-sensitive tube may be limited by the use of the shutter 28. This shutter is of an adjustable type so that the area of the opening may be varied in known amounts by the operator. Preferably, it will be openable between stops so that its open area may be increased by a given amount, say twice.

Referring next to FIGURE 4, the attenuation detection apparatus in the vehicle includes a voltage supply 38 and gain adjust 40 for the photo-sensitive device 34, the latter preferably being a photo-multiplier tube. The light modulating device 32, to be hereinafter described in detail, positioned in the path to the photo-multiplier serves to modulate the light in order that A.C. techniques can be used for processing the electrical signal produced by the photo-multiplier.

A problem encountered in utilizing the inventive occultation technique is the elimination of error caused by background radiation. This background radiation is produced by two sources. The first represents radiation emanating from stars close to the direction of the line-of-sight of the selected star. The other source is radiation generated in planetary atmospheres due to ionization effects and the like. Background radiation introduces additional radiation to the photo-multiplier thereby rendering inaccurate the attenuation response of the detection system to be hereinafter described. To eliminate this background radiation, a discriminating reticle is utilized which may correspond to the modulator 32 previously mentioned. This reticle is designed to expose a constant background radiation area to the photo-multiplier. A modulation device 32 that exposes the photo-multiplier alternately to the area defined by the iris and adjacent equal background area is suitable for synchronous detection. A rotating spoked reticle operating only in the iris area may be used for non-synchronous detection. Such devices intercept background radiation at right angles to expose the photo-multiplier to constant background radiation. By positioning the modulator 32 at the focal plane of the optical system, the image of the selected star may be chopped while simultaneously allowing a constant amount of background radiation to pass to the photo-multiplier. The photo-multiplier responds to the constant background radiation to produce a D.C. component at its outlet while simultaneously responding to the modulated radiation of the selected star to produce an A.C. component. Only the A.C. component is amplified by an amplifier 42 connected to the photo-multiplier output line 36. Therefore, the effect of the background radiation is eliminated.

The modulator 32 will interrupt the radiation reaching the photo-sensitive device at a convenient frequency, say 1,000 times per second so that the A.C. amplifier 42 may be employed on the output of tube 34 to amplify the alternating voltage generated thereby. To eliminate signals from the tube 34 at frequencies other than near that of the modulator frequency, a filter 35 is used between the amplifier and a demodulator 44. The demodulator, serving as a detector, may be operated synchronously or asynchronously with respect to the modulator 32 depending on the type of modulator employed. FIGURE 4 illustrates synchronous operation with a drive device 46 coupling the modulator and demodulator. An additional filter 48 aids in the rejection of ripple in the D.C. output from the demodulator, and the filtered output is then supplied to a level detector 50.

Level detector 50 is a device to indicate when a given level of radiation from the star is reached. A Schmitt trigger circuit is excellent for this purpose. The output of the level detector, on line 52, will be used as a threshold trigger as explained below.

In operation, a star about to pass behind the planet, but not yet intercepting the atmosphere, is selected and its image centered in the reticle (FIGURE 3). The shutter 28 is closed down to its predetermined limit. The gain adjust 40 is then manipulated manually or automatically until the level detector 50 just operates. This procedure provides a calibration in terms of the original intensity of the star's radiation. The shutter is then opened to its other limit, the operator maintaining the star's image centered in the reticle. Opening the shutter initially increases the input signal to the level detector, and places the latter in one of its operative states.

The operator continues to track the star as its light is intercepted by the atmosphere. As the line-of-sight extends deeper into the atmosphere, the radiation becomes progressively attenuated, and at a certain moment the signal to the level detector 50 will have decreased to the value whereat the detector was set to operate when the shutter was in its closed condition. The output signal from the level detector may now be used as a trigger to record the actual time of this occurrence, and the ingress moment therefore is recorded.

In terms of equipment, it is preferred that the open position of the shutter should add about twice the operative area compared to its closed area.

The invention described above and claimed below is useful whenever the time of ingress of a star behind a planet is desired. No limitation to use in any particular method of navigation is necessary or intended. The equipment will provide ingress time even when there is no atmosphere about the planet, as in the case of the moon, albeit that the ingress signal will then depend primarily upon the "line-of-sight" being blocked by a point of the planet itself. The primary advantage of the invention is that no absolute intensity measurements need be made of the sighted star's radiation, and each star generates its own reference signal.

Now that the method and apparatus for determining ingress times have been described, a brief explanation will be made here of one navigational technique in which they may be employed to aid the reader in an appreciation of the usefulness of the present invention.

It will be assumed that the space vehicle is on a Keplerian orbit about a solar system planet whose gravitational force field is spherically symmetric. The parameters of the orbit are six. These are:

$a$ = semi-major axis of the elliptical orbit
$e$ = eccentricity of orbit
$i$ = inclination of orbit plane
$\omega$ = argument of perigee
$\Omega$ = argument of line of nodes
$T_p$ = time at perigee These are all taken relative to a cartesian coordinate frame with its origin at the planet's center. Utilizing the earth as the planet and the equator thereof as a reference, the angle of ascension is measured along the equator and the angle of declination is measured up from the equator. The orbit of the space vehicle may be projected on a celestial sphere to show the instantaneous position of the space vehicle and some of the orbit parameters ($i$, $\omega$, $\Omega$). The remaining orbit parameters are contained in the true anomaly $\theta_1$ as shown in FIGURE 6.

At the time a star's radiation is attenuated by the selected amount, the geometrical relationship shown in FIGURE 5 results. The position of the $i$th star is indicated on the celestial sphere as the right ascension ($\alpha_i$) and the declination ($\delta_i$). These quantities are known, provided the star is identified. The position of the vehicle is given by the inclination of the orbit ($i$), by the longitude of the ascending node ($\Omega$), and by the sum of the argument of the perigee ($\omega$), and the true anomaly ($\theta_i$). The fact that ($\theta_i$) is itself a function of the remaining orbit parameters ($e$, $a$, $T_p$) and the time is of no immediate concern.

In FIGURE 5, $\gamma_i$ is the angle between the position of the observer and that of the star. By means of spherical trigonometry it can be shown that the following relation exists between the quantities shown in FIGURE 5:

$$\cos \gamma_i = \cos \delta_i \cos (\alpha_i - \Omega) \cos (\theta_i + \omega)$$
$$+ \sin \delta_i \sin i \sin (\theta_i + \omega)$$
$$\pm \cos \delta_i \cos i \sin (\theta_i + \omega) \sin (\alpha_i - \Omega)$$

where subscript $i = 1, 2 \ldots 6$, and the plus and minus ($\pm$) signs in front of the last term is indicative of the fact that $\theta_i$ can have two values for the transit of a given star.

This is the basic equation which will apply as the dynamic formula of space vehicle movement. As has been stated, there are a total of six unknowns in this equation, it will be necessary therefore to make six star attenuation time measurements to solve for the six unknowns. This is a highly transcendental equation, and its solution requires making an initial estimate of the orbital elements and then solving for the errors in the initial estimate through a process of successive approximation. Experience in solving this equation indicates it is sufficiently complicated to require the use of a digital computer.

The true anomaly, $\theta_i$ is a function of three orbital elements ($e$, $T$, $T_p$) and time, where $e$ = eccentricity of orbital ellipse; $T$ = period of orbit (a function of $a^{3/2}$ where $a = \frac{1}{2}$ the major axis of the orbital ellipse); and $T_p$ = time of passing perigee. Thus, one must make the following substitutions in the dynamic equation in order to arrive at a solution.

$$\theta_i = M_i + 2e \sin M_i + \tfrac{5}{4} e^2 \sin 2M_i + \ldots$$

where $$M_i = 2\pi \left( \frac{t_i - T_p}{T} \right)$$

The unknowns in the dynamic equation are therefore $\Omega$, $i$, $\omega$, $T$, $e$, $T_p$. The known quantities are $\alpha_i$ and $\delta_i$, which vary for each star and the measured quantity is $t_i$, the time of selected radiation attenuation of the $i$th star.

The above equations are further elaborated upon in the co-pending application, Serial Number 240,693, of Robert L. Lillestrand and Joseph E. Carroll filed on November 28, 1962.

As stated previously, the quantities in these equations are shown in FIGURES 5 and 6.

To refine the actual orbit determination, the above equation should, of course, also contain additional terms because of the aspheric shape of the earth, because of the atmospheric corrections used since the transit occurs above the surface of the earth, and because of the secular and periodic variations in the orbital elements which also arise from the earth's aspheric shape.

The present invention may be employed in this navigational technique by utilizing six recordations of star ingress times, each taken with respect to a different star. The recordings are made in a general purpose computer. Such a computer may be programmed with the parameters of the solar system. Utilizing the six time records the computer can solve the navigation equations to locate the vehicle in space and can also extrapolate to predict its location at a future time.

One limitation to accuracy in this system arises because of the inability to predict the earth's atmospheric density profile. However, a density prediction in the altitude range from 50,000 to 80,000 feet can be made to an accuracy of about 1,000 feet R.M.S. provided seasonal latitudinal corrections are made. The effect of this atmospheric error on the error of the navigational position fix depends on the receiving geometry and resultant error sensitivity coefficients.

Another limitation to accuracy arises because of wave length dependence of the atmospheric attenuation. By limiting the system response to operation between 0.36 and 0.52 micron, it is possible to minimize this source of error. It will be about the same magnitude as the atmospheric errors after making corrections. The Balmer limit lies at 0.36 micron and radiation from the stars contains a sharp discontinuity at this point. Above 0.36 micron the spectral energy distribution from the stars can be described by a black-body radiation curve. The long wave length cutoff is placed at 0.52 micron to avoid the unpredictable attenuation caused by atmospheric ozone.

Some of the stars will have variable intensity. This will normally cause no difficulty because each star forms its own intensity reference. The only case in which a star of variable intensity can be troublesome is that in which its rate of intensity variation is greater than 2 or 3% per minute; i.e., from the time of the intensity calibration while the star is above the atmosphere until the time the atmospheric attenuation builds up to 50% (or the selected amount if other attenuation percentage is employed). An example of a star having variable intensity is Algol. Normally it has a magnitude of about 2.2; however, it changes from 2.2 to 3.4 magnitude during 5 hours and immediately returns to its normal magnitude value of 2.2 in 5 additional hours. Assuming an average rate of change of intensity of $4.7 \times 10^{-3}$ magnitudes/minute, the percentage change in intensity would be about 1% per minute. This level of variability will probably not be troublesome. However, if it were, the digital computer could be programmed to reject data from this star.

The method and structural arrangement disclosed herein are examples of navigation systems in which the inventive features of this disclosure may be utilized, and it will be readily apparent to one skilled in the art that certain modifications may be made within the spirit of the invention as defined by the appended claims.

What is claimed is:

1. A method of determining the time of ingress of a star behind a first body in space as viewed from a second body in space comprising the steps of generating and recording the level of a signal proportional to the intensity of radiant energy received from the star through an aperture of a given area when the path of radiation is clear of the first body and any atmosphere thereabout, increasing said aperture area by a predetermined percentage of area by removing radiation blocking means, and generating a triggering signal when the signal attenuates to a value having a predetermined relation to said recorded signal as the first body intercepts the path between the star and the second body.

2. A method of determining the time of ingress of a star behind a first body in space as viewed from a second body in space comprising the steps of generating and recording the level of a signal proportional to the intensity of radiant energy received from the star through an aperture of a given area when the path of radiation is clear of the first body and any atmosphere thereabout, increasing said aperture area by a predetermined percentage of area by removing radiation blocking means, and generating a triggering signal when the signal attenuates to a value having a predetermined relation to said recorded signal as the atmosphere about said first body intercepts the path between the star and the second body.

3. Apparatus for determining the time of ingress of a star behind a first body in space as viewed from a second body in space comprising: optical means for observing said star, a photo-sensitive device associated with said optical means such that radiation from said star is directed to the device by said optical means, said photo-sensitive device producing an output signal which varies proportionally to the amount of radiation applied thereto, shutter means associated with said optical means and operable between first and second positions for controlling the amount of star radiation passed from said optical means to said photo-sensitive device, said second shutter position offering less attenuation to radiation passage than said first position, signal level detection means connected to said photo-sensitive device and operatively responsive to the output signal developed by said photo-sensitive device, said signal level detection means being adjustable to a threshold level of operation with said shutter means in its first position, said signal level detecting means including means for generating an output signal when said threshold level is reached with the shutter means in its second position.

4. Apparatus as set forth in claim 3 further comprising light modulating means interposed between said optical means and said photo-sensitive device and demodulating means between said photo-sensitive device and said level detector.

5. Apparatus as set forth in claim 4 further comprising means for synchronously operating said modulating and demodulating means.

References Cited by the Examiner

UNITED STATES PATENTS

| | | | |
|---|---|---|---|
| 2,631,489 | 3/1953 | Golay | 88—14 |
| 2,917,967 | 12/1959 | Steglich | 88—1 |
| 2,924,754 | 2/1960 | Mead. | |
| 2,963,243 | 12/1960 | Rothe | 244—1 |
| 3,060,823 | 10/1962 | Nelson | 88—23 |
| 3,100,264 | 8/1963 | Jaffee et al. | 250—203 |
| 3,127,516 | 3/1964 | Ammerman et al. | 250—203 |
| 3,131,249 | 4/1964 | Kunze | 88—1 |
| 3,138,712 | 6/1964 | Aroyan | 250—203 |
| 3,141,095 | 7/1964 | Klose | 88—1 X |

JEWELL H. PEDERSEN, *Primary Examiner.*

D. R. STEVENS, F. SHOON, *Assistant Examiners.*